United States Patent [19]

Durand

[11] 4,034,698
[45] July 12, 1977

[54] MAXIMUM TEMPERATURE-INDICATOR

[75] Inventor: James C. Durand, Peoria, Ill.

[73] Assignee: Caterpillar Tractor Co., Peoria, Ill.

[21] Appl. No.: 705,844

[22] Filed: July 16, 1976

[51] Int. Cl.² .................... G01K 5/20; G01K 5/44
[52] U.S. Cl. ......................... 116/114 Z; 73/368.3; 73/396
[58] Field of Search .... 116/114 Z, 114 Y, 114 AE, 116/114.5, 129 B, 106; 73/363, 396, 368.3

[56] References Cited
U.S. PATENT DOCUMENTS

| | | | |
|---|---|---|---|
| 1,422,278 | 7/1922 | Low | 73/396 |
| 1,465,726 | 8/1923 | Bowden | 73/396 |
| 1,600,370 | 9/1926 | Sohm | 116/114 Z |
| 2,548,878 | 4/1951 | Dillman | 73/368.3 X |
| 3,027,730 | 4/1962 | Bauerlein | 73/368.3 |
| 3,659,783 | 5/1972 | Schwartz | 236/93 |
| 3,687,365 | 8/1972 | Laessig | 236/99 |
| 3,779,080 | 12/1973 | Smith | 73/396 |
| 3,942,467 | 3/1976 | Witonsky | 116/114 V |

Primary Examiner—Richard C. Queisser
Assistant Examiner—Daniel M. Yasich
Attorney, Agent, or Firm—Philips, Moore, Weissenberger, Lempio & Majestic

[57] ABSTRACT

A compact shock-resistant device may be mounted on a vehicle engine or the like, in thermal contact with engine coolant flow for example, to record an indication of the maximum operating temperature reached during an extended period of use. A tubular housing has threads or the like for mounting in a fluid-retaining wall of the engine with one end being within the fluid and with the other end being accessible at the exterior of the wall. An indicator rod is disposed for axial movement in the housing with one end being visible from outside when a protective cap is removed. Thermally expansible means such as a wax cartridge within the housing exerts a force against the other end of the rod to cause outward movement of the rod when the ambient temperature exceeds the highest temperature previously reached. Spring ratchet means or the like blocks return movement of the rod in the opposite direction. Accordingly, the extent to which the visible end of the rod has increased in length after a period of time is indicative of the maximum temperature reached during that period.

15 Claims, 2 Drawing Figures

U.S. Patent  July 12, 1977  4,034,698
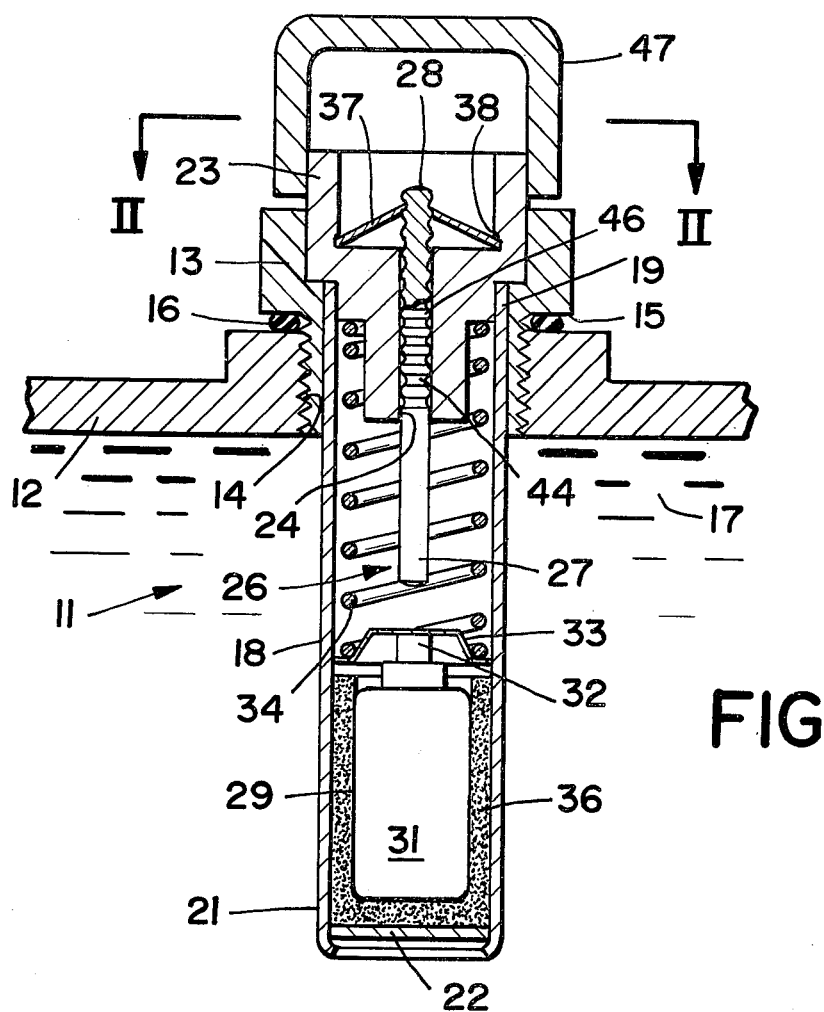
FIG _ 1
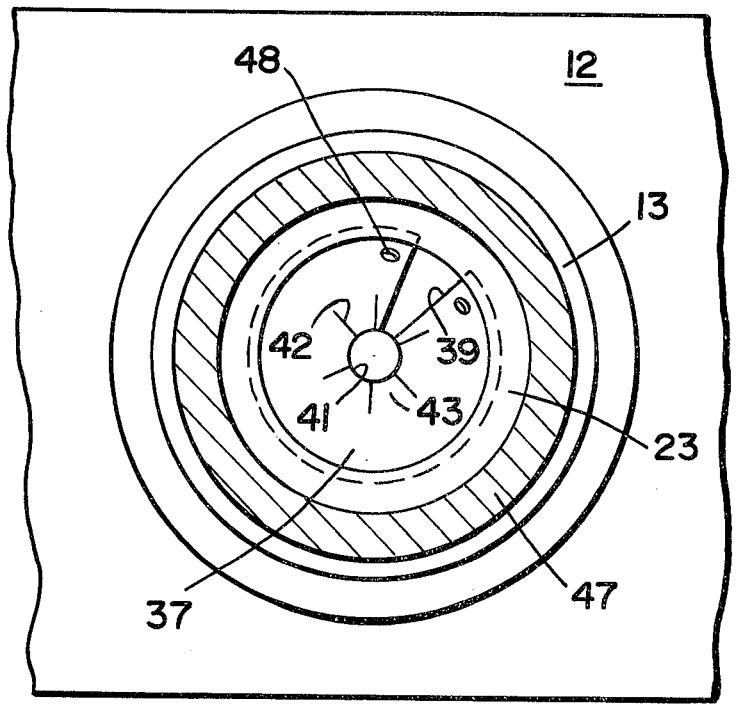
FIG _ 2

MAXIMUM TEMPERATURE-INDICATOR

BACKGROUND OF THE INVENTION

This invention relates to temperature-indicating devices and more particularly to instruments for storing a representation of the maximum temperature occurring in an adjacent region during an interval of time.

The invention may be used, for example, to record the highest temperature reached by the coolant or lubricant of an engine and may be used for similar purposes in conjunction with vehicle transmissions, torque converters or hydraulic systems and the like.

Internal combustion engines, transmissions, implement hydraulic systems and certain other fluid-containing devices as used in vehicles or elsewhere are usually equipped with a temperature-indicator of the form that displays a reading that changes as system fluid temperature changes or, in other cases, which lights an indicator lamp or the like if temperature exceeds a predetermined value. These devices alert the operator to possible malfunction or a need for maintenance procedures. They do not provide a very satisfactory means of determining the maximum temperature reached over an extended period of time such as several weeks or months. While this information might be theoretically available from the dial type of indicator, the operator does not as a practical matter continually watch the indicator nor necessarily make the kind of prolonged recording of readings which would be required.

Information on maximum fluid temperature during a long period of time may be of interest to the operator of a vehicle or the like and to maintenance personnel but may be of even more significance to vehicle component designers. An engine, for example, is manufactured with a cooling system, variously including radiators, fans, coolant pumps and the like which components contribute significantly to the bulk, weight, complication and cost of the engine. This system is initially designed to have some predetermined cooling capacity based on an estimate of what is expected to be the maximum cooling requirements in use. If it develops that insufficient cooling capacity was provided, that quickly becomes evident to operators and that information is usually soon relayed back to the manufacturer. However, the converse is not necessarily true.

If an engine has been provided with more cooling capacity than is actually necessary under the working conditions to which it is eventually put, that fact may not become known to the manufacturer for a very long period if at all.

At first consideration, it might appear that the presence of excess cooling capacity would not be a disadvantage but this is not the case when practical considerations are taken into account. Excess cooling capacity means that there is excess weight, bulk and complication in the vehicle and that fuel consumption is unnecessarily high. It also means that the cost of the engine has been made unnecessarily high.

To enable manufacturers to learn of a situation where a particular engine model is being produced with more cooling capacity than is needed for the uses to which the engine is typically being put, there is a need for a compact, rugged, economical device which can be installed on a representative sampling of such engines for a sizable period of time and which will detect and store indications of the maximum temperatures reached by the engines during that period. Copending application Ser. No. 705,845 of the present applicant, filed July 16, 1976 and entitled MAXIMUM TEMPERATURE RANGE INDICATOR discloses one form of instrument for this purpose in which successively higher temperatures change the effective electrical resistance of a resistor. An ohmmeter or similar electrical instrument is needed in order to read out the stored temperature data.

SUMMARY OF THE INVENTION

This invention is a compact, simple and rugged device which can be installed on an engine or other vehicle component or the like for an extended period of time to store a representation of the maximum temperature which occurs within the engine coolant, lubricant hydraulic fluid or the like during operation of the vehicle.

A housing has mounting means enabling the instrument to be attached to an engine or other vehicle component with one end being within a wall that retains fluid. An indicator rod is disposed for movement relative to the housing in response to expansion of a thermally sensitive element such as a wax cartridge for example. Means are provided for inhibiting return movement of the indicator rod. An end of the indicator rod is inspectable at the exterior end of the housing and the length of the visible end of the rod is indicative of the maximum temperature which has occurred since installation or resetting of the device.

Accordingly, it is an object of the invention to provide a compact, economical and reliable device for recording an indication of the maximum temperature which occurs within an engine or other vehicle component or the like during an extended period of time.

The invention, together with further objects and advantages thereof, will best be understood by reference to the following description of a preferred embodiment taken in conjunction with the accompanying drawings.

BRIEF DESCRIPTION OF THE DRAWINGS

In the accompanying drawings:

FIG. 1 is an axial section view of an instrument embodying the invention shown mounted in a coolant channel of an engine, and FIG. 2 is a cross-section view of the instrument of FIG. 1 taken along line I—I thereof.

DESCRIPTION OF A PREFERRED EMBODIMENT

Referring to FIGS. 1 and 2 in conjunction, the maximum temperature-indicator 11 is shown disposed in a typical operating position, specifically on a wall 12 of the radiator of an engine. It should be understood that the indicator 11 may be installed at any of various other positions such as on an engine block or lubricant-retaining engine pan or adjacent a water pump or oil pump among other suitable locations.

In this example the indicator has mounting means consisting of an annular collar 13 provided with threads for engagement in an internally threaded access opening 14 in wall 12. Many engines have suitable threaded access openings 14 already present for various purposes but when this is not the case it is a simple matter to provide one, to accommodate indicator 11, either during manufacture of the engine or afterwards.

Collar 13 may be provided with a step 15 in order to compress a resilient annular seal 16 against wall 12 to forestall leakage of coolant fluid 17 through opening 14.

Indicator 11 has a fluid-tight housing means formed in part by a tubular member 18 which has one end 19 extending axially into collar 13 and secured therein. The other end 21 of tubular member 18 extends into the engine coolant 17 region so that heat from the coolant is transferred by conduction to the tubular member. The inner end 21 of tubular member 18 is closed by a fluid-impervious end member 22.

A stepped annular indicator rod guide 23 is secured within collar 13 and the outer end 19 of tubular member 18 in coaxial relationship therewith and has an axial passage 24. Guide 23 supports a movable indicator rod 26 which extends through the guide passage 24 and has one end 27 within tubular member 18 and another end 28 which extends outward from the exterior end of passage 24.

Rod 26 is thus movable in an axial direction relative to guide 23. Initially the rod 26 is set in the position depicted in the drawings at which only a relatively small portion of the outer end 28 of the rod 26 protrudes from guide 23. Thermally expansible means 29 are provided within tubular member 18 to shift the rod outwardly in response to temperature rises.

The thermally expansible means 29 may be a wax expansion cartridge 31, sometimes referred to as a power pill, of the known form commonly used in cooling system thermostats. Such cartridges 31 have a plunger 32 at one end which moves outward along the axis of the cartridge as ambient temperature increases, with the amount of such movement being a function of the magnitude of the temperature rise.

Cartridge 31 may be disposed coaxially within the inner end 21 of tubular member 18 with plunger 32 being spaced a small distance from the inner end 27 of indicator rod 26 when the cartridge is at temperatures below the operating range of temperatures of the engine.

Accordingly, plunger 32 will extend to shift indicator rod 26 outwardly only when a temperature rise occurs and the amount of outward movement of rod 26 is dependent on the magnitude of the temperature rise. Once an intial movement of rod 26 occurs in this manner there will be no subsequent rod movement until such time as a subsequent temperature rise of still greater magnitude occurs. Many temperature fluctuations occur in an engine over an extended period of time and thus the position of the rod 26 after a period of use is indicative of the highest temperature reached during that period.

To assure retraction of plunger 32 from end 27 of the indicator rod upon cooling of cartridge 31 following a temperature rise, a dished disc 33 may be abutted against the end of the plunger and a compression spring 34 is disposed coaxially within tubular member 18 between the disc and guide 23.

Under some conditions it may be desirable that the instrument be insensitive to very brief temperature rises which are not necessarily indicative of cooling system problems. Under these conditions thermal insulation 36, which may be any of various known materials of low heat conductivity, may be disposed between cartridge 31 and the inner wall of tubular member 18. Insulation 36 delays the conduction of heat to cartridge 31 sufficiently to avoid displacement of rod 26 if a temperature rise is very brief.

Means are provided to inhibit return movement of rod 26, such means in this example being formed in part by a conical resilient spring member 37 disposed coaxially within guide 23 with the peripheral portion of the spring member being retained in an annular groove 38 in the interior wall of the guide. A narrow sector portion 39 of the spring member is cut away so that it may be radially compressed in order that it may be engaged in groove 38. Spring member 37 has an opening 41 at the center or apex through which the exterior end 28 of indicator rod 26 extends. Opening 41 is of slightly less diameter than indicator rod 26 but the spring member has radially directed slots 42 extending from the opening to form tabs 43 which may deflect sufficiently to allow the rod to pass through the opening.

The outer end 28 portion of the indicator rod 26 is formed with a series of axially spaced annular grooves 44 separated by annular ribs 46. The resilient tabs 43 of the spring member 37 thus enter the grooves 44 to provide a ratchet effect which allows the indicator rod 26 to be forced outwardly by plunger 32 but which resists return movement. The spring member tabs 43 also act to hold the indicator rod 26 at each progressively more outward position that may be reached in response to each progressively greater temperature rise that may occur.

If it is necessary to guard against accidental displacement of indicator rod 26 from a blow, a moving object or some other cause, a removable protective cap 46 may be fitted onto the outer end of guide 23.

In operation, the maximum temperature-indicator 11 is mounted at the radiator or other suitable location on an engine as previously described. At that time, rod 26 is positioned so that the ratchet tabs 43 are engaged in the outermost one of the grooves 44 of the indicator rod. A pair of holes 48 may be provided in spring member 37, one being on each side of the cutaway sector so that pointed tools may be used to temporarily distort the spring member to make this initial setting. Alternately, the rod 26 may simply be pushed inward to this initial setting as tabs 43 will temporarily deflect outward in the presence of sufficient force.

Thereafter, as the engine is operated, plunger 32 will extend to force rod 26 outwardly a distance determined by the extent of temperature rise in engine coolant 17. As tabs 43 inhibit return movement of indicator rod 26, the amount of displacement of the rod from the original position at any given time is indicative of the maximum temperature which has occurred up to that time. In order to determine this maximum temperature simply from visual inspection, the instruments may be calibrated in advance by subjecting the instruments to a progressively rising temperature and noting the temperature increment in degrees which is needed to extend rod 26 a distance equal to the spacing of each adjacent pair of ribs 46. With this information, the maximum temperature which has occured in an engine equipped with the device may easily be determined by counting the number of ribs 46 which are visible above spring member 37. The temperature increment represented by each rib 46 may then be multiplied by the count of visible ribs and the product may then be added to the known base temperature at which outward movement of indicator rod 26 first commences, in order to arrive at the desired maximum temperature value.

Thus the ribs 46 may serve as visible indicia for determining maximum temperature in addition to functioning as elements of the means for inhibiting movement of the indicator rod 26.

While the invention has been described with respect to a particular embodiment, it will be apparent that many modifications are possible and it is not intended to limit the invention except as defined in the following claims.

I claim:

1. A maximum temperature indicator device for storing an indication of the highest temperature which occurs in the region of said device during an interval of time, comprising:

housing means, an indicator element mounted in said housing means for movement relative thereto, guide means for constraining movement of said indicator element relative to said housing means to movement along a predetermined path, through an end of said housing means, thermally expansible means mounted in proximity to a first end of said indicator element for moving said indicator element along said predetermined path a distance which is a function of the amount of temperature increase which occurs in said region, and means for inhibiting return movement of said indicator element along said predetermined path.

2. The device of claim 1 further comprising mounting means for attaching said device to a vehicle component having a wall member with said first end of said indicator element being within said vehicle component and the other second end of said indicator element being inspectable from the exterior side of said vehicle component wall.

3. The device of claim 2 further comprising a removable protective cap fittable on said housing means to enclose said second end of said indicator element.

4. The device of claim 1 wherein said guide means is a member having a passage therethrough defining said predetermined path and wherein said indicator element is a rod extending within said passage for axial movement therein.

5. The device of claim 4 wherein said guide means forms an end surface of said housing means wherein said first end of said rod is within said housing means and wherein the other second end of said indicator element rod protrudes from said end surface.

6. The device of claim 5 wherein at least a portion of said second end of said indicator element rod has a plurality of visible indicia distributed therealong.

7. The device of claim 6 wherein said visible indicia are defined by spaced-apart ribs separated by grooves formed along said portion of said indicator element rod and wherein said means for inhibiting return movement of said indicator element comprises at least one resilient element contacting said portion of said indicator element rod and entering successive ones of said grooves as said rod is moved by said thermally expansible means.

8. The device of claim 7 wherein said resilient element is oriented to resist said return movement more strongly than opposite movement is resisted.

9. The device of claim 5 wherein said means for inhibiting return movement comprises a conical resilient element adjacent said end surface and having a peripheral portion fixed relative thereto and having a central opening at the center through which said second end of said indicator element extends, said conical resilient element being mounted at said end surface and flexed to exert pressure against said indicator element rod.

10. The device of claim 9 wherein said conical resilient element has a sector-shaped slot extending from said peripheral portion thereof to said central opening thereof.

11. The device of claim 10 wherein said conical resilient element has a plurality of angularly spaced slots extending radially from said central opening.

12. The device of claim 1 further comprising thermal insulative material disposed in proximity to said thermally expansible means for slowing conduction of heat thereto.

13. The device of claim 1 wherein said indicator element is a rod supported for axial movement by said guide means and wherein said thermally expansible means is a wax cartridge disposed in said housing means and having a plunger at one end for contacting said first end of said indicator element.

14. The device of claim 13 wherein said plunger is spaced from said first end of said indicator element when said cartridge is within a first temperature range and bears against said indicator element rod only after the temperature of said cartridge rises above said range.

15. The device of claim 13 further comprising at least one resilient spring positioned to urge said plunger away from said first end of said indicator element.

* * * * *